United States Patent
Feng et al.

(10) Patent No.: US 12,526,539 B2
(45) Date of Patent: Jan. 13, 2026

(54) IMAGE PROCESSING WITH ADJUSTABLE BOKEH EFFECT

(71) Applicant: QUALCOMM Incorporated, San Diego, CA (US)

(72) Inventors: Wen-Chun Feng, New Taipei (TW); Yu-Ren Lai, Xinyi District (TW); Su-Chin Chiu, Wanhua District (TW)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/180,593

(22) Filed: Mar. 8, 2023

(65) Prior Publication Data

US 2024/0303779 A1    Sep. 12, 2024

(51) Int. Cl.
| | |
|---|---|
| H04N 23/959 | (2023.01) |
| G03B 7/095 | (2021.01) |
| G06T 5/50 | (2006.01) |
| G06T 5/70 | (2024.01) |
| G06T 7/11 | (2017.01) |
| H04N 23/67 | (2023.01) |

(52) U.S. Cl.
CPC ........... *H04N 23/959* (2023.01); *G03B 7/095* (2013.01); *G06T 5/50* (2013.01); *G06T 5/70* (2024.01); *G06T 7/11* (2017.01); *H04N 23/67* (2023.01); *G06T 2207/20221* (2013.01)

(58) Field of Classification Search
None
See application file for complete search history.

(56) References Cited

U.S. PATENT DOCUMENTS

| | | | |
|---|---|---|---|
| 9,307,221 B1* | 4/2016 | Tang | H04N 23/689 |
| 9,456,195 B1* | 9/2016 | Wajs | H04N 19/172 |
| 9,734,551 B1* | 8/2017 | Esteban | G06T 5/70 |
| 10,382,712 B1* | 8/2019 | Forutanpour | H04N 23/80 |
| 10,664,953 B1* | 5/2020 | Lanman | G06N 3/08 |
| 10,992,845 B1* | 4/2021 | Seely | H04N 5/2226 |
| 2011/0122287 A1* | 5/2011 | Kunishige | H04N 23/743 |
| | | | 348/E5.037 |
| 2011/0229052 A1* | 9/2011 | Li | G06T 5/70 |
| | | | 382/264 |

(Continued)

OTHER PUBLICATIONS

International Search Report and Written Opinion—PCT/US2024/010712—ISA/EPO—Apr. 29, 2024.

*Primary Examiner* — James M Hannett
(74) *Attorney, Agent, or Firm* — Norton Rose Fulbright US LLP/QUALCOMM Incorporated

(57) ABSTRACT

This disclosure provides systems, methods, and devices for image signal processing that support adjusting a Bokeh effect in image data. In a first aspect, a method of image processing includes receiving a first user input specifying a first depth of focus. A camera is configured with a first aperture size of a plurality of aperture sizes of the camera that is nearest a second aperture size that corresponds to the first depth of focus. The first aperture size is smaller than the second aperture size. Image data representing a scene is received that is captured with the first aperture size of the camera. First modified image data is determined by applying a first blur kernel to the image data. The first modified image data represents the scene at the depth of focus corresponding to the second aperture size. Other aspects and features are also claimed and described.

16 Claims, 7 Drawing Sheets

(56) References Cited

U.S. PATENT DOCUMENTS

| | | | |
|---|---|---|---|
| 2014/0152886 A1* | 6/2014 | Morgan-Mar | H04N 23/95 |
| | | | 348/349 |
| 2016/0094779 A1 | 3/2016 | Arakawa et al. | |
| 2019/0253593 A1* | 8/2019 | Li | H04N 23/951 |
| 2020/0175651 A1* | 6/2020 | Zhang | G06T 5/60 |
| 2020/0213512 A1 | 7/2020 | Yasutomi | |
| 2021/0287343 A1 | 9/2021 | Kaida | |
| 2021/0407050 A1 | 12/2021 | Seely et al. | |
| 2022/0156887 A1* | 5/2022 | Lin | G06T 5/50 |
| 2022/0337759 A1 | 10/2022 | Ono et al. | |

* cited by examiner

IMAGE PROCESSING WITH ADJUSTABLE BOKEH EFFECT

TECHNICAL FIELD

Aspects of the present disclosure relate generally to image processing, and more particularly, to adjusting a Bokeh effect of an image. Some features may enable and provide improved image processing, including generating a Bokeh effect for an image that corresponds to an aperture size of a camera that is different than the aperture size of the camera with which the image is captured.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person to be significantly blurred. Lower aperture lenses produce higher blurring than higher aperture lenses. However, lower aperture lenses generally are larger in size and made from higher-cost materials.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An image representing a scene and displaying the Bokeh effect includes in-focus parts of the scene in the image and blurry, out-of-focus parts of the scene in the image. The aperture size of a lens capturing the image can determine which parts of the image are in-focus and which parts are out-of-focus, and/or can determine a level of blurriness of the out-of-focus parts. Image processing methods are provided for adjusting the Bokeh effect displayed in an image representing a scene by adjusting which parts of the scene are blurry versus in-focus in the image and/or adjusting a blurriness level of certain parts of the scene in the image. In some embodiments, an image processing method is provided for adjusting the Bokeh effect when the image is captured with a variable aperture camera. In other embodiments, an image processing method is provided for adjusting the Bokeh effect when the image is captured with a non-variable (e.g., fixed) aperture camera.

In one aspect of the disclosure, a method for image processing includes receiving a first user input specifying a first depth of focus; configuring a camera with a first aperture size of a plurality of aperture sizes of the camera that is nearest a second aperture size that corresponds to the first depth of focus, wherein the first aperture size is smaller than the second aperture size; receiving image data representing a scene captured with the first aperture size of the camera; and determining first modified image data by applying a first blur kernel to the image data, wherein the first modified image data represents the scene at the depth of focus corresponding to the second aperture size.

In an additional aspect of the disclosure, an apparatus includes at least one processor and a memory coupled to the at least one processor. The at least one processor is configured to perform the operations including receiving a first user input specifying a first depth of focus; configuring a camera with a first aperture size of a plurality of aperture sizes of the camera that is nearest a second aperture size that corresponds to the first depth of focus, wherein the first aperture size is smaller than the second aperture size; receiving image data representing a scene captured with the first aperture size of the camera; and determining first modified image data by applying a first blur kernel to the image data, wherein the first modified image data represents the scene at the depth of focus corresponding to the second aperture size.

In an additional aspect of the disclosure, a method for image processing includes receiving image data comprising a first image frame representing a scene captured at a first focus point and a second image frame captured at a second focus point, the image data captured by a camera at a first aperture size; receiving a first user input specifying a first depth of focus corresponding to a second aperture size different from the first aperture size; and when the second aperture size is smaller than the first aperture size: determining a combined image frame comprising at least a first portion of the first image frame and a second portion of the second image frame, wherein the first portion corresponds to the first focus point and the second portion corresponds to the second focus point; and determining first modified image data from the combined image frame by applying a first blur kernel to the combined image frame. The first modified image data represents the scene at the depth of focus corresponding to the second aperture size.

In an additional aspect of the disclosure, an apparatus includes at least one processor and a memory coupled to the at least one processor. The at least one processor is configured to perform the operations including receiving image data comprising a first image frame representing a scene captured at a first focus point and a second image frame captured at a second focus point, the image data captured by a camera at a first aperture size; receiving a first user input specifying a first depth of focus corresponding to a second aperture size different from the first aperture size; and when the second aperture size is smaller than the first aperture size: determining a combined image frame comprising at least a first portion of the first image frame and a second portion of the second image frame, wherein the first portion corresponds to the first focus point and the second portion corresponds to the second focus point; and determining first modified image data from the combined image frame by applying a first blur kernel to the combined image frame. The first modified image data represents the scene at the depth of focus corresponding to the second aperture size.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
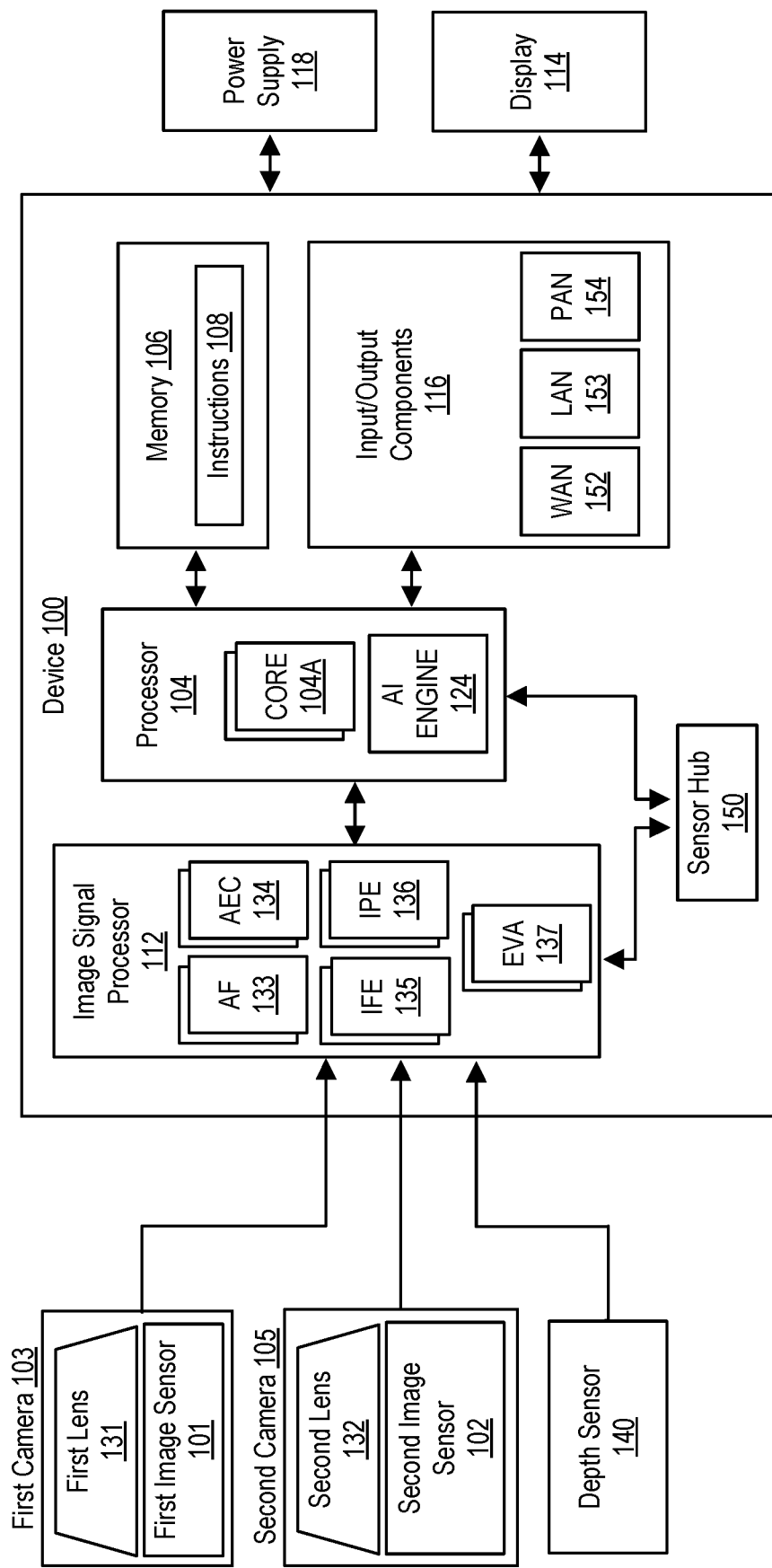
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for adjusting the Bokeh effect displayed in an image representing a scene by adjusting which parts of the scene are blurry versus in-focus in the image and/or adjusting a blurriness level of certain parts of the scene in the image. In some embodiments, an image processing method is provided for adjusting the Bokeh effect when the image is captured with a variable aperture (VA) camera. In an example of such embodiments, a depth of focus selected by a user for image capture using a VA camera is received via an input function on a device including the VA camera. An aperture size of the VA camera is selected that is nearest to and smaller than a simulated aperture size that corresponds to the selected depth focus. An image may then be captured with the VA set to the selected aperture size. The captured image is modified by applying a blur kernel to the captured image so that the resulting modified image represents an image captured with the simulated aperture size despite the VA camera not physically including an aperture size equal to the simulated aperture size.

In other embodiments, an image processing method is provided for adjusting the Bokeh effect when the image is captured with a non-variable (e.g., fixed) aperture camera. In such other embodiments, a depth of focus selected by a user for image capture using a fixed aperture (FA) camera is received via an input function on a device including the FA camera. The selected depth of focus corresponds to a simulated aperture size that is smaller than the aperture size of the FA camera. An image may then be captured with the FA camera. The captured image is modified so that every area of a scene represented by the captured image is in-focus, such that an all-in-focus image is determined by the modification. The all-in-focus image is modified by applying a blur kernel to the all-in-focus image so that the resulting modified image represents an image captured with the simulated aperture size despite the FA camera not physically including an aperture size equal to the simulated aperture size.

Particular implementations of the subject matter described in this disclosure may be implemented to realize one or more of the following potential advantages or benefits. In some aspects, the present disclosure provides techniques for generating an improved Bokeh effect in an image for different capturing conditions of a VA camera or of a non-VA camera. In some aspects, techniques are provided for enabling a user to select a target of focus of the Bokeh effect in an image after the image is captured. In some aspects, techniques are provided for enabling a user to adjust a level of blurriness of one or more objects (e.g., a background of the image) in an image after the image is captured.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure.

However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. The processor 104 and/or the image signal processor 112 may perform operations for controlling the cameras 103 and 105, such as to adjust a variable aperture size, and/or to adjust a Bokeh effect in image data captured from the cameras 103 and 105.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including depth-of-focus blur operations. For example, execution of the instructions can instruct the image signal processor 112 to begin or end capturing an image frame or a sequence of image frames, in which the capture includes depth-of-focus blur operations as described in embodiments herein. In another example, execution of the instructions can instruct the image signal processor 112 to modify a captured image frame or a sequence of image frames in a way that includes depth-of-focus blur operations. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition, such as to determine a focus point for application of a Bokeh effect. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by processing an image to adjust a Bokeh effect of the image based on an image captured by the image capture device. One example method of operating one or more cameras, such as camera 103, is shown in FIG. 2 and described below.

Figure 2:
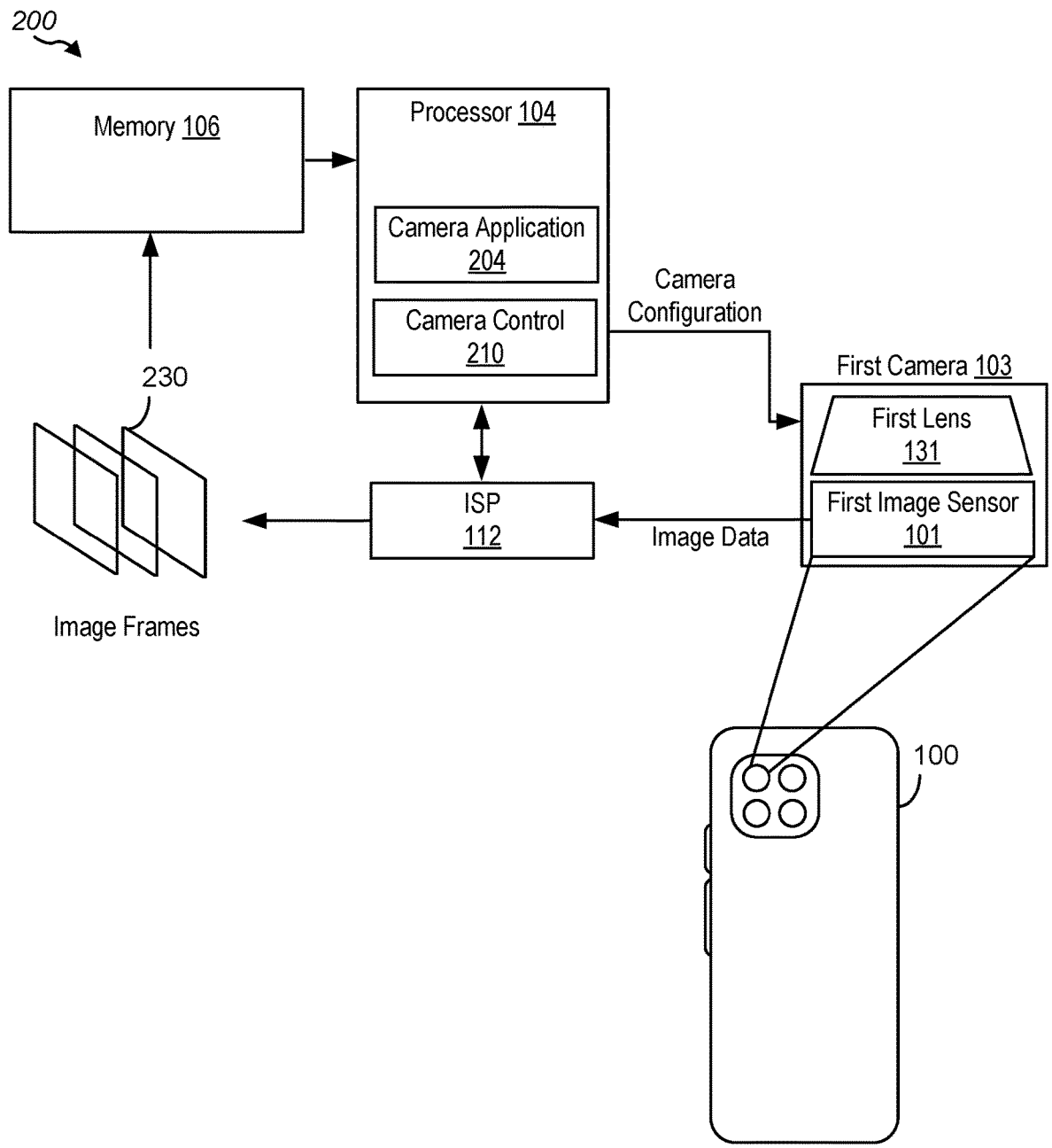
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may include parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0.

The image data received from camera 103 may be processed in one or more blocks of the ISP 112 to form image frames 230 that are stored in memory 106 and/or provided to the processor 104. In some embodiments, the ISP 112 may apply effects to the image frames 230. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 3:
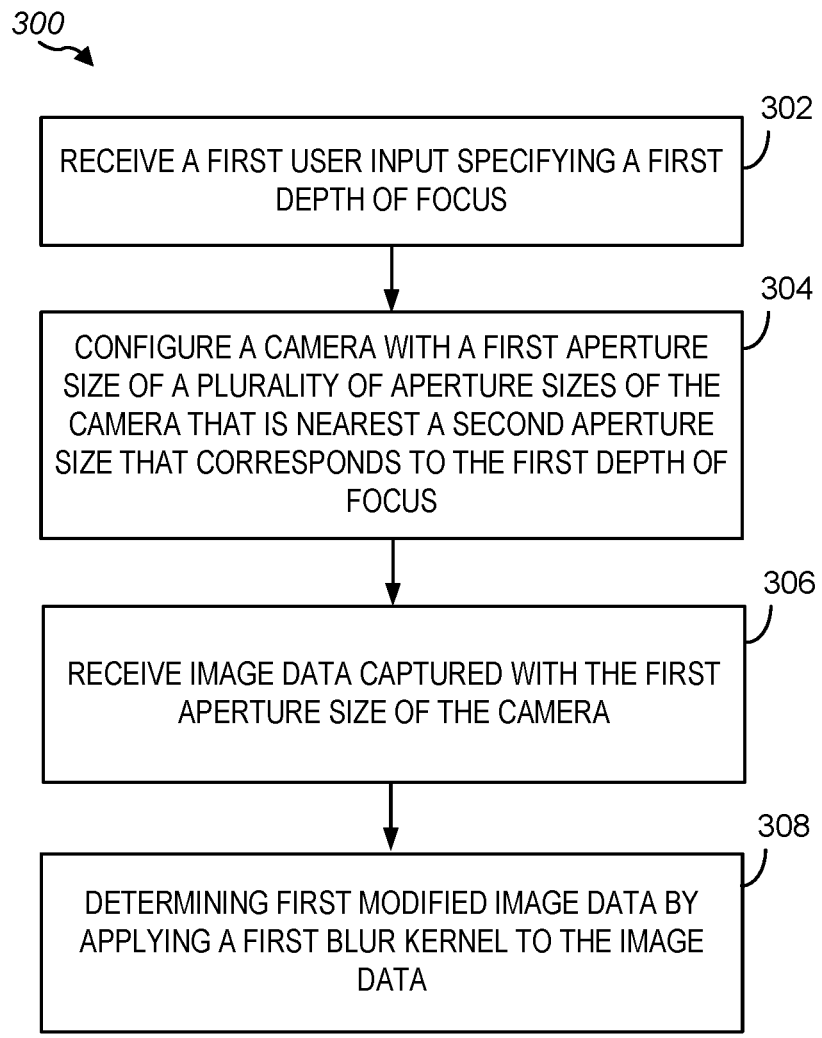
FIG. 3 shows a flow chart of an example method for processing image data to adjust a Bokeh effect of image data captured with a variable aperture lens according to some embodiments of the disclosure.

The system 200 of FIG. 2 may be configured to perform the operations described with reference to FIG. 3 to determine output image frames 230. FIG. 3 shows a flow chart of an example method for processing image data to adjust a Bokeh effect of image data captured by a variable aperture lens according to some embodiments of the disclosure. The capturing in FIG. 3 may obtain an improved digital representation of a scene, which results in a photograph or video with higher image quality (IQ).

At block 302, a first user input is received from the input/output (I/O) components 116 that specifies a first depth of focus. In at least some embodiments, the first depth of focus is one of a plurality of depths of focus along a sliding scale. Stated differently, by way of example, the plurality of depths of focus along the sliding scale may include all of the values f/1.4, f/1.5, f/1.6, f/1.7, f/1.8, f/1.9, f/2.0, f/2.1, f/2.2, f/2.3, f/2.4, f/2.5, f/2.6, f/2.7, f/2.8, f/2.9, f/3.0, f/3.1, f/3.2, f/3.3, f/3.4, f/3.5, f/3.6, f/3.7, f/3.8, f/3.9, and f/4.0 despite a camera only being capable of capturing an image with a physical aperture at some of the aperture sizes on the sliding scale.

At block 304, a camera is configured with a first aperture size of a plurality of aperture sizes of the camera that is nearest a second aperture size that corresponds to the first depth of focus. The first aperture size is smaller than the second aperture size. The plurality of aperture sizes of the camera does not include the second aperture size. Stated differently, the camera may be a VA camera that has predetermined aperture sizes that are available (e.g., f/1.4, f/2.0, f/2.8, and f/4.0) and the second aperture size (e.g., f/3.2) corresponding to the specified depth of focus is not included in the available predetermined aperture sizes.

At block 306, first image data representing a scene is received. For example, the first image data is received from the image sensor, such as while the image sensor is configured with the camera configuration. The first image data is captured with the first aperture size of the camera. The first image data may be received at ISP 112, processed through an image front end (IFE) and/or an image post-processing engine (IPE) of the ISP 112, and stored in memory. In some embodiments, the capture of image data may be initiated by a camera application executing on the processor 104, which causes camera control 210 to activate capture of image data by the camera 103 and cause the image data to be supplied to a processor, such as processor 104 or ISP 112.

At block 308, first modified image data is determined by applying a first blur kernel to the image frame. The first modified image data represents the scene at the depth of focus corresponding to the second aperture size. Stated differently, while the VA of camera does not physically include the second aperture size, the first modified image data simulates the image data being captured by the camera as if the VA did include the second aperture size.

The first blur kernel is determined based on the second aperture size corresponding to the depth of focus specified in the user input. For example, a blur kernel lookup table may be generated using artificial intelligence (AI) or computer vision (CV)-based methods. The first blur kernel may then be determined from the blur kernel lookup table based on the second aperture size, a shape of the aperture of the camera, and a focal distance from a target area (e.g., object, subject, background, etc.) of the scene represented by the image data. The target area is selected by user input. The first blur kernel can be Gaussian, Laplacian, etc. A user can select any area of the scene to be the in-focus target area, and therefore, in at least some aspects, a blur kernel is generated for each scenario of an area in a scene being in-focus. As such, when a specific area is selected as the target area, the blur kernel corresponding to that specific area being in-focus is selected to be applied.

In at least some embodiments, a segmentation map is used as a part of, or in addition to, applying the first blur kernel to the image frame. The segmentation map aids in applying a desired degree of blur to each area (e.g., object, subject, background, etc.) of a scene represented in an image. In some aspects, the segmentation map can be obtained from a depth map by CV-based boundary extraction. In other aspects, the segmentation map can be obtained from a depth map by deep learning-based semantic segmentation. As used herein, a depth map is an image or image channel that contains information relating to the distance of the surfaces of scene areas (e.g., objects) from a viewpoint of a camera.

Figure 7:
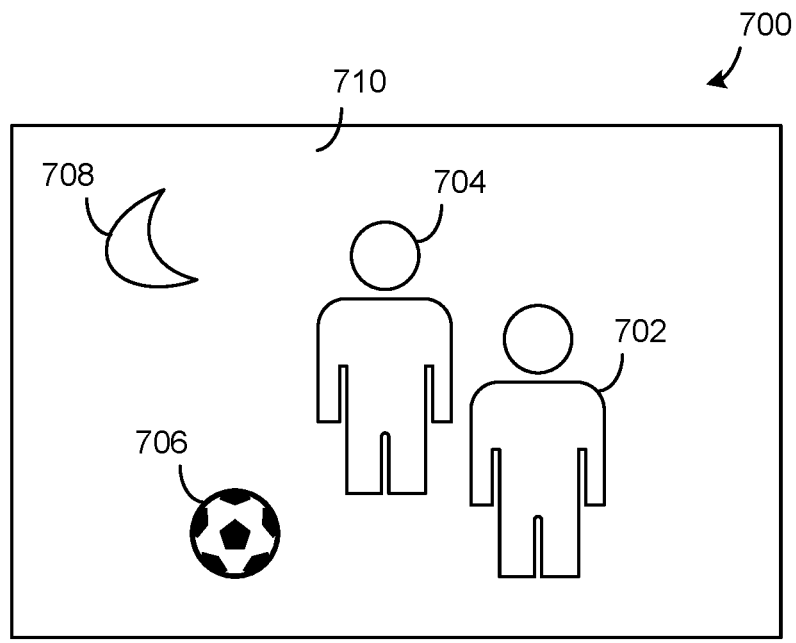
FIG. 7 is a depiction of a scene that is represented by image data.

To help illustrate the effect of the first blur kernel, FIG. 7 shows a depiction of a scene 700 represented by the image data. The scene 700 comprises multiple areas (e.g., objects, subjects, background, portions of the scene, etc.) including an individual 702, an individual 704, a soccer ball 706, a moon 708, and a background 710. The individual 702 and the soccer ball 706 are at a first, closest focal distance from the camera, the individual 704 is at a second, intermediate focal distance from the camera, the moon 708 is at a third, intermediate focal distance from the camera, and the background 710 is at a fourth, furthest focal distance from the camera.

In an example, a VA camera includes aperture sizes of f/4.0, f/2.8, f/2.0, and f/1.4. A user input specifies a depth of focus such that the individual 704 is in-focus (is the target area) and which corresponds to an aperture size of f/3.2 (e.g., the second aperture size), which is in between the aperture sizes f/4.0 and f/2.8 of the camera. The aperture size f/4.0 is nearest, and smaller than, the specified aperture size f/3.2, and thus an image is captured (e.g., the image data) using the aperture size f/4.0 (e.g., the first aperture size). A modified image (e.g., first modified image data) is determined by applying a first blur kernel to the captured image, which results in the application of blur in the modified image to simulate the aperture size of f/3.2 in the image data captured at f/4.0. In some instances, another area of the scene, such as the moon 708, may be in-focus in the captured image, but out-of-focus in the modified image after the first blur kernel is applied. In some instances, another area of the scene, such as the background 710, may be out-of-focus at a first degree of blurriness in the captured image and out-of-focus at a second, different degree of blurriness in the modified image after the first blur kernel is applied.

Returning to FIG. 3, the first modified image data (e.g., image frames 230) may be determined by the processor 104 or ISP 112 and stored in memory 106. The stored image frames may be read by the processor 104 and used to form a preview display on a display of the device 100 and/or processed to form a photograph for storage in memory 106 and/or transmission to another device.

In various embodiments, a user can adjust the Bokeh effect of a captured image at a later point in time. In such embodiments, method 300 may further include receiving, subsequent to determining the first modified image data, a second user input specifying a second depth of focus different than the first depth of focus. The second depth of focus corresponds to a third aperture size that is different than the first aperture size and the second aperture size. Second modified image data may be determined by applying a second blur kernel to at least one of the first modified image data and the image data. The second modified image data represents the scene at the second depth of focus. Continuing the example of FIG. 7, a user input could later be received that specifies a depth of focus such that the individual 702 and the soccer ball 706 are in-focus (are the target area) and which corresponds to an aperture size of f/2.9 (e.g., the third aperture size), which is in between the aperture sizes f/4.0 and f/2.8 of the camera. A second modified image (e.g., second modified image data) is determined by applying a second blur kernel to the image captured using the aperture size f/4.0 (e.g., the first aperture size), which results in the individual 702 and the soccer ball 706 being in-focus in the second modified image. In another example, rather than the individual 702 and the soccer ball 706 being in-focus in the second modified image, the individual 704 is still in-focus in the second modified image, but a degree of blurriness of one or more areas of the scene is changed.

Figure 4:
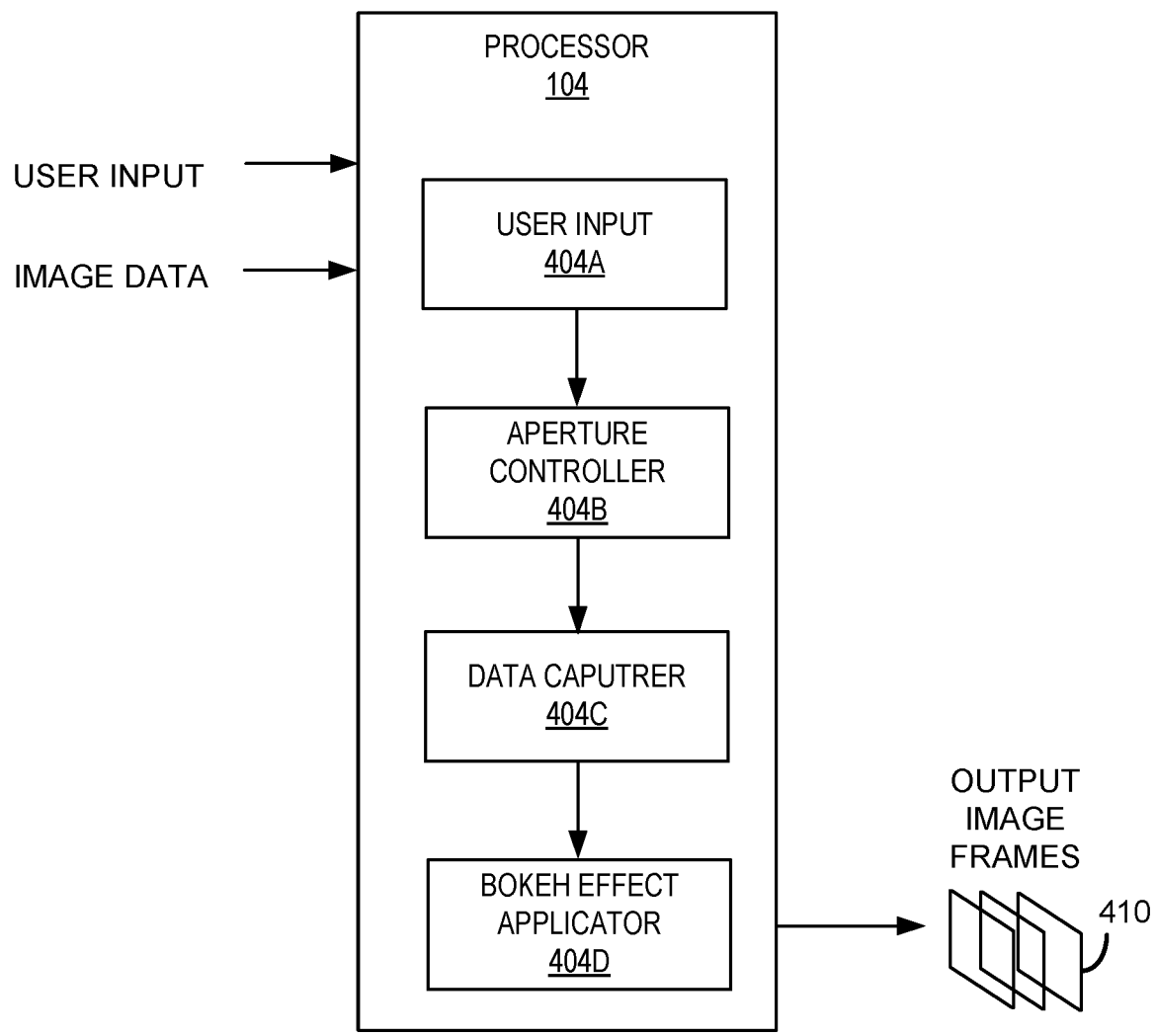
FIG. 4 is a block diagram illustrating an example processor configuration for image data processing in an image capture device according to one or more embodiments of the disclosure.

FIG. 4 is a block diagram illustrating an example processor configuration for image data processing in an image capture device according to one or more embodiments of the disclosure. The processor 104, or other processing circuitry, may be configured to operate on image data to perform one or more operations of the method of FIG. 3. User input and image data may be processed to determine one or more output image frames 410.

At block 404A, the processor 104 receives user input that specifies a depth of focus. For example, the specified depth of focus corresponds with a target area being in-focus of a scene represented by image data.

At block 404B, the processor 104 determines a first aperture size of a plurality of aperture sizes of a camera that is nearest a second aperture size that corresponds to the first depth of focus. The first aperture size is smaller than the second aperture size. For example, the camera may be a variable aperture (VA) camera that has predetermined aperture sizes that are available (e.g., f/1.4, f/2.0, f/2.8, and f/4.0). The second aperture size (e.g., f/3.2) corresponding to the specified depth of focus is not included in the available predetermined aperture sizes.

At block 404C, the processor 104 receives image data. For example, the processor 104 receives the first image data from the image sensor, such as while the image sensor is configured with the camera configuration. The first image data is captured with the first aperture size of the camera.

At block 404D, the processor 104 determines first modified image data by applying a first blur kernel to the image frame. The first modified image data represents the image data at the depth of focus corresponding to the second aperture size. Stated differently, while the VA of the camera does not physically include the second aperture size, the first modified image data simulates the image data being captured by the camera as if the VA did include the second aperture size.

Figure 5:
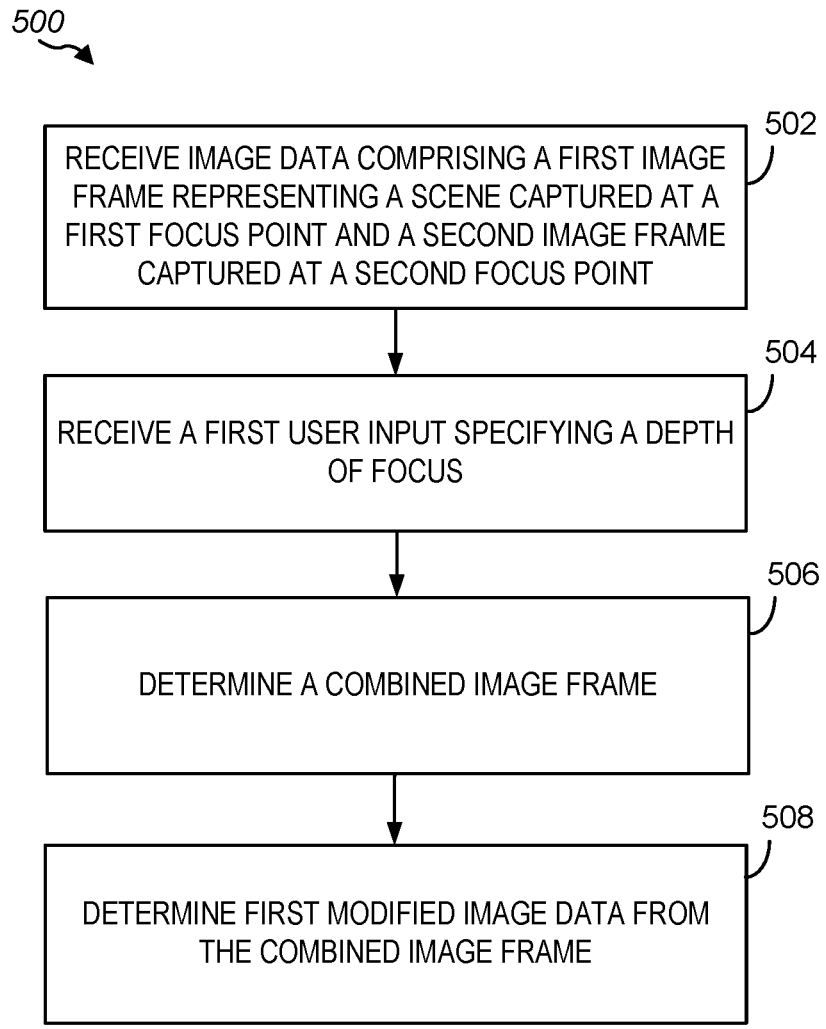
FIG. 5 shows a flow chart of an example method for processing image data to adjust a Bokeh effect of image data captured with a non-variable aperture lens according to some embodiments of the disclosure.

The system 200 of FIG. 2 may be configured to perform the operations described with reference to FIG. 5 to determine output image frames 230. FIG. 5 shows a flow chart of an example method for processing image data to adjust a Bokeh effect of image data captured by a non-variable (e.g., fixed) aperture lens according to some embodiments of the disclosure. The capturing in FIG. 5 may obtain an improved digital representation of a scene, which results in a photograph or video with higher image quality (IQ).

At block 502, image data is received comprising a first image frame representing a scene captured at a first focus point and a second image frame captured at a second focus point. For example, the first image data may be received from the image sensor, such as while the image sensor is configured with the camera configuration. The image data is captured by a camera at a first aperture size. In at least some examples, the camera is a fixed aperture camera that has the first aperture size as the only aperture size available. The first image data may be received at ISP 112, processed through an image front end (IFE) and/or an image post-processing engine (IPE) of the ISP 112, and stored in memory. In some embodiments, the capture of image data may be initiated by a camera application executing on the processor 104, which causes camera control 210 to activate capture of image data by the camera 103, and cause the image data to be supplied to a processor, such as processor 104 or ISP 112.

At block 504, a first user input is received from the input/output (I/O) components 116 specifying a first depth of focus. The first depth of focus corresponds to a second aperture size different from the first aperture size. In at least some instances, the first depth of focus corresponds with a target area being in-focus of a scene represented by image data.

At block 506, when the second aperture size is smaller than the first aperture size, a combined image frame is determined comprising at least a first portion of the first image frame and a second portion of the second image frame. The first portion corresponds to the first focus point and the second portion corresponds to the second focus point. The combined image frame is determined such that every area of a scene represented by the image data is in-focus. In various embodiments, the first focus point is different than the second focus point and the combined image frame is generated by fusing the first image frame and the second image frame. In a first example, the sharper areas from each of a first image frame that has a near focal point and a second image frame that has a far focal point are fused together to determine an image frame that has all area in-focus. This first example may be used, for example, when a depth of focus of a captured scene is relatively deep. In another example, focus may be placed on an area of the scene that has an intermediate focal point (e.g., not the nearest or farthest area in the image) and a respective blur kernel is applied to the out-of-focus areas of the scene based on a defocus distance.

At block 508, when the second aperture size is smaller than the first aperture size, first modified image data is determined from the combined image frame by applying by applying a first blur kernel to the combined image frame. The first modified image data represents the scene at the depth of focus corresponding to the second aperture size. Stated differently, while the fixed aperture of the camera does not physically include the second aperture size, the second modified image data simulates the image data being captured by the camera as if the fixed aperture did include the second aperture size. The first blur kernel can be determined based on the second aperture size corresponding to the depth of focus specified in the user input as described above in relation to FIG. 4.

In various embodiments, when the second aperture size is larger than the first aperture size, then first modified image data is determined from the image data by applying a first blue kernel to the first image frame.

Returning to FIG. 7, in an example, a fixed aperture camera includes an aperture size of f/2.0. A user input specifies a depth of focus such that the background 710 is in-focus (is the target area) and which corresponds to an aperture size of f/4.0 (e.g., the second aperture size), which is smaller than the aperture size f/2.0 of the fixed aperture camera. An image (e.g., image data) is captured by the fixed aperture camera; however, the background 710 is out-of-focus in the scene represented by the image when the image is captured with an aperture size of f/2.0. An all-in-focus image (e.g., first modified image data) is determined from the image data. The all-in-focus image is modified (e.g., second modified image data) by applying the first blur kernel to the all-in-focus image, which results in the background 710 being in-focus in the modified image. In some instances, another area of the scene, such as the moon 708, may be in-focus in the captured image, but out-of-focus in the modified image after the first blur kernel is applied. In some instances, another area of the scene, such as the individual 704, may be out-of-focus at a first degree of blurriness in the captured image and out-of-focus at a second, different degree of blurriness in the modified image after the first blur kernel is applied.

Returning to FIG. 5, the second modified image data (e.g., image frames 230) may be determined by the processor 104 or ISP 112 and stored in memory 106. The stored image frames may be read by the processor 104 and used to form a preview display on a display of the device 100 and/or processed to form a photograph for storage in memory 106 and/or transmission to another device.

In various embodiments, a user can adjust the Bokeh effect of a captured image at a later point in time. In such embodiments, method 500 may further include receiving, subsequent to determining the first modified image data, a second user input specifying a second depth of focus different than the first depth of focus. The second depth of focus corresponds to a third aperture size that is different than the first aperture size and the second aperture size. Second modified image data may be determined by applying a second blur kernel to the image data. The second modified image data represents the scene at the second depth of focus. Continuing the example of FIG. 7, a user input could later be received that specifies a depth of focus such that the moon 706 is in-focus (is the target area) and which corresponds to an aperture size of f/2.4 (e.g., the third aperture size), which is less than the aperture size f/2.0 of the fixed aperture camera. A third modified image (e.g., second modified image data) is determined by applying a second blur kernel to the image captured using the aperture size f/2.0 (e.g., the first aperture size), which results in the moon 708 being in-focus in the third modified image. In another example, rather than the moon 708 being in-focus in the third modified image, the background 710 is still in-focus in the third modified image, but a degree of blurriness of one or more areas of the scene is changed.

Figure 6:
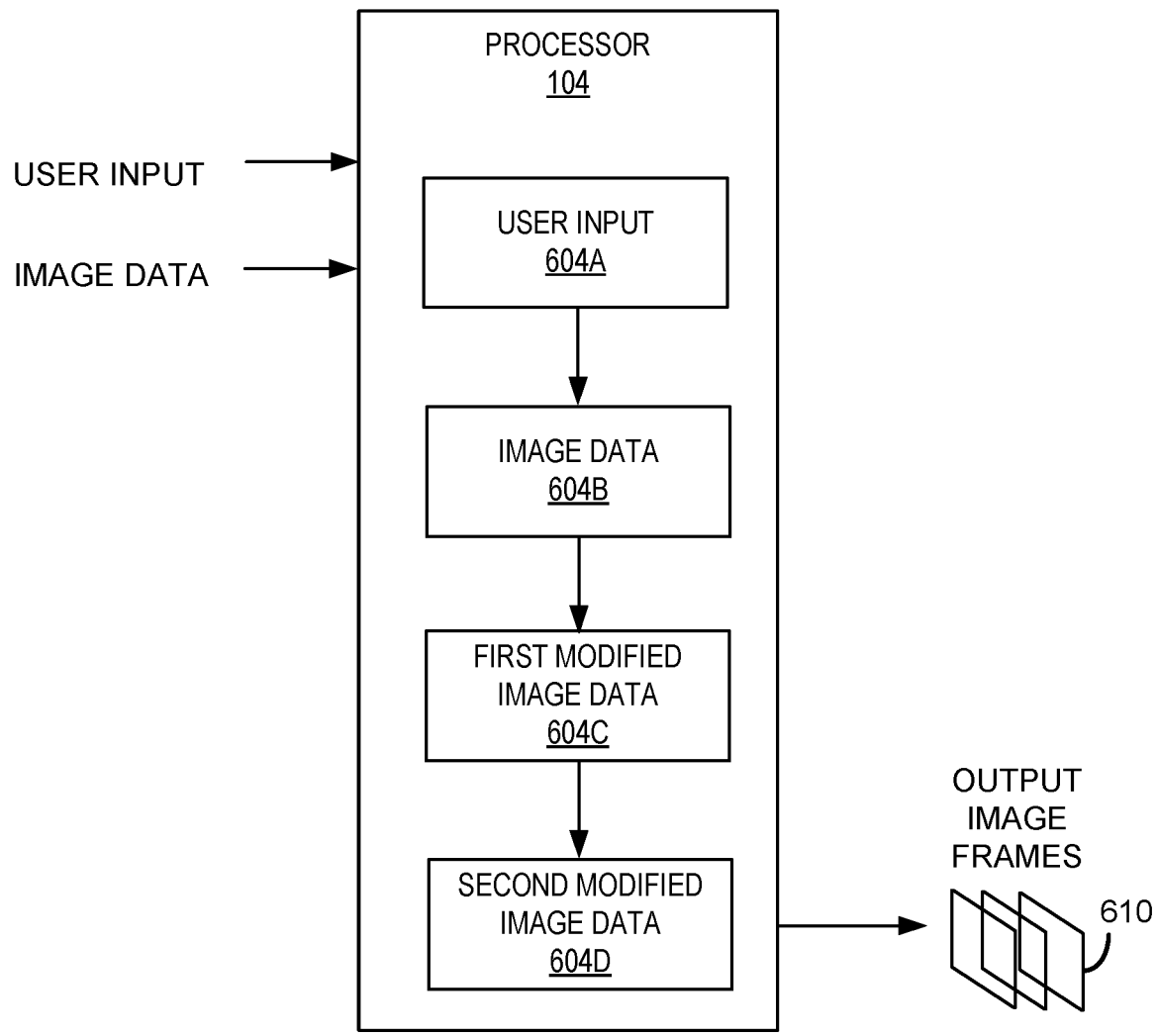
FIG. 6 is a block diagram illustrating an example processor configuration for image data processing in an image capture device according to one or more embodiments of the disclosure.

FIG. 6 is a block diagram illustrating an example processor configuration for image data processing in an image capture device according to one or more embodiments of the disclosure. The processor 104, or other processing circuitry, may be configured to operate on image data to perform one or more operations of the method of FIG. 5. The image data may be processed to determine one or more output image frames 610.

At block 604A, the processor 104 receives user input that specifies a depth of focus. For example, the specified depth of focus corresponds with a target area being in-focus of a scene represented by image data.

At block 604B, the processor 104 receives image data. For example, the processor 104 receives the image data from the image sensor, such as while the image sensor is configured with the camera configuration. The image data is captured with the first aperture size of the camera (e.g., fixed aperture camera).

At block 604C, the processor 104 determines first modified image data from the image data such that every area of a scene represented by the first modified image data is in-focus in the first modified image data. Stated differently, the processor 104 determines an all-in-focus image from the image data.

At block 604D, the processor 104 determines second modified image data by applying a first blur kernel to the first modified image data. The second modified image data represents the image data at the depth of focus corresponding to the second aperture size. Stated differently, while the fixed aperture of the camera does not physically include the second aperture size, the second modified image data simulates the image data being captured by the camera as if the fixed aperture did include the second aperture size.

Figure 8:
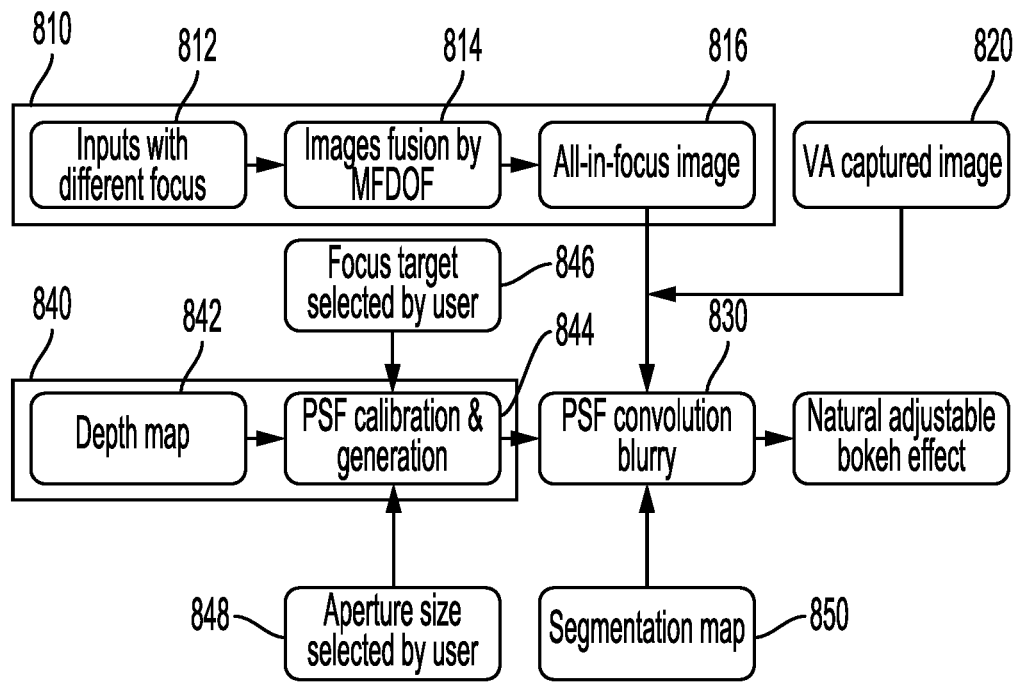
FIG. 8 is a block diagram illustrating image processing techniques for determining an image frame with adjustable Bokeh effect according to some embodiments of the disclosure.

One or more of the techniques described above for processing data from a VA or non_VA camera system to provide adjustable Bokeh effect may be applied to an image capture device, such as shown in FIG. 8. FIG. 8 is a block diagram illustrating image processing techniques for determining an image frame with adjustable Bokeh effect according to some embodiments of the disclosure. A point spread function (PSF) convolution blur may be applied to VA-captured image data 820 or non-VA-captured image data 810. The VA-captured image data 820 may be image data captured through a variable aperture lens at an aperture size corresponding to a user selection for depth-of-focus or aperture size. The aperture size may be small enough to obtain a representation of the scene with a large enough depth-of-blur to obtain desired areas in focus, to which a blur is applied at block 830 to obtain the effect of a larger aperture size in at least a portion of the image. The non-VA-captured image data 810 may include image data captured from a lens with a fixed aperture size that may be large causing portions of the representation of the scene to appear blurry. The non-VA camera may be operated to obtain image data from different exposures at different focus depths at block 812 and those different exposures combined at block 814 to obtain an image frame with lower blurriness at block 816 and effectively a representation of the scene captured at a smaller aperture size.

Either of the non-VA-captured image data 810 or the VA-captured image data 820 may be processed at block 830 by applying a PSF at block 830 to increase blur in a portion of the image. The blur may be applied through a segmentation map 850 input to the block 830. The segmentation map 850 may provide information identifying segments of the scene. Each portion may have blur applied or not applied at block 830. In some embodiments, the segments may receive different amounts of blur from the PSF at block 830. The PSF applied at block 830 may be determined by an optical blur block 840. The optical blue block 840 may use a depth map 842 to determine parameters for the PSF at block 844. For example, higher depth values may receive stronger point spreading. The PSF determined at block 844 may also be based on a focus target selected by the user at block 846. For example, a depth corresponding to the selected target may be used to apply stronger blurring from the PSF to segments that are further in distance from the selected target depth. The PSF determined at block 844 may also be based on an aperture size selected by the user at block 848. For example, the aperture size may determine a strength of blurring, with larger user-selected aperture sizes leading to more blurring or stronger PSF and smaller user-selected aperture sizes leading to less blurring or weaker PSF.

The PSF determined at block 844 may be applied to the image data at block 830 to determine a corrected image frame, which is a representation of the scene with an appearance corresponding to a user-selected aperture size or user-selected depth of focus despite the camera not having the aperture size available. Further, the processing of FIG. 8 may be repeated to provide for editing the Bokeh effect in the representation of the scene.

According to some aspects of the image processing of FIG. 8, the processing includes capturing a image with Bokeh using a variable aperture (VA) camera. When the user selects an aperture size for a photograph that is not in the VA configuration, point spread function (PSF) kernels are interpolated from a smaller aperture and applied to segments of the image to obtain the desired blurring. For example, if the real aperture size is f/2.8 and the user selects an aperture size that is f/2.7, then aspects of the processing described above may be used to apply real image blur on the background segment of the image to increase the Bokeh effect to correspond to an aperture size of f/2.7. Although addition of blurring is described in some embodiments, the techniques may also be applied to reduce blurring to obtain a representation of a scene with an effective smaller aperture size.

In some embodiments, an image frame with large depth of focus may be obtained by combining multiple exposures, which results in an image frame with an effective small aperture size but brightness similar to a large aperture size. This image frame may be referred to as an "all-in-focus"

frame. The Bokeh effect of the image frame may be adjusted to determine a corrected image frame by considering distance and PSF on different segments of the image frame, such as by applying different kernels from the blur kernel map on the all-in-focus image.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform operations including receiving a first user input specifying a first depth of focus; configuring a camera with a first aperture size of a plurality of aperture sizes of the camera that is nearest a second aperture size that corresponds to the first depth of focus, wherein the first aperture size is smaller than the second aperture size; receiving image data representing a scene captured with the first aperture size of the camera; and determining first modified image data by applying a first blur kernel to the image data. The first modified image data represents the scene at the depth of focus corresponding to the second aperture size.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first depth of focus is one of a plurality of depths of focus along a sliding scale.

In a third aspect, in combination with one or more of the first aspect or the second aspect, the camera includes a variable aperture lens configured to capture an image at each of the plurality of aperture sizes.

In a fourth aspect, in combination with the third aspect, the plurality of aperture sizes does not include the second aperture size.

In a fifth aspect, in combination with one or more of the first aspect through the fourth aspect, the first blur kernel is determined based on the second aperture size.

In a sixth aspect, in combination with one or more of the first aspect through the fifth aspect, the blur kernel decreases a blurriness of at least a segment of the representation of the scene.

In a seventh aspect, in combination with one or more of the first aspect through the sixth aspect, the blur kernel increases a blurriness of at least a segment of the representation of the scene.

In an eighth aspect, in combination with one or more of the first aspect through the seventh aspect, the operations further include: receiving, subsequent to determining the first modified image data, a second user input specifying a second depth of focus different than the first depth of focus, wherein the second depth of focus corresponds to a third aperture size that is different than the first aperture size and the second aperture size; and determining second modified image data by applying a second blur kernel to at least one of the image data or the first modified image data, wherein the second modified image data represents the image data at the second depth of focus.

In a ninth aspect, in combination with one or more of the first aspect through the eighth aspect, supporting image processing may include an apparatus configured to perform operations including receiving image data comprising a first image frame representing a scene captured at a first focus point and a second image frame captured at a second focus point, the image data captured by a camera at a first aperture size; receiving a first user input specifying a first depth of focus corresponding to a second aperture size different from the first aperture size; and when the second aperture size is smaller than the first aperture size: determining a combined image frame comprising at least a first portion of the first image frame and a second portion of the second image frame, wherein the first portion corresponds to the first focus point and the second portion corresponds to the second focus point; and determining first modified image data from the combined image frame by applying a first blur kernel to the combined image frame. The first modified image data represents the scene at the depth of focus corresponding to the second aperture size.

In a tenth aspect, in combination with the ninth aspect, the first depth of focus is one of a plurality of depths of focus along a sliding scale.

In an eleventh aspect, in combination with one or more of the ninth aspect through the tenth aspect, the first aperture size of the camera is a fixed aperture.

In a twelfth aspect, in combination with one or more of the ninth aspect through the eleventh aspect, the first blur kernel is determined based on the second aperture size.

In a thirteenth aspect, in combination with one or more of the ninth aspect through the twelfth aspect, the operations further include receiving a segmentation map corresponding to the image data, the segmentation map indicating a first segment and a second segment of the scene. Determining the first modified image data comprises applying the first blur kernel to a first segment of the combined image frame and applying a second blur kernel to a second segment of the combined image frame.

In a fourteenth aspect, in combination with one or more of the ninth aspect through the thirteenth aspect, the operations further include, when the second aperture size is larger than the first aperture size, determining first modified image data from the image data by applying a first blur kernel to the first image frame.

In a fifteenth aspect, in combination with one or more of the ninth aspect through the fourteenth aspect, the operations further include receiving, subsequent to determining the first modified image data, a second user input specifying a second depth of focus different than the first depth of focus, wherein the second depth of focus corresponds to a third aperture size that is different than the first aperture size and the second aperture size; and determining second modified image data by applying a second blur kernel to the first modified image data, wherein the second modified image data represents the scene at the second depth of focus.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2, 4, and 6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3-6 may be combined with one or more blocks (or operations) described with reference to another of the figures. For example, one or more blocks (or operations) of FIG. 4 may be combined with one or more blocks (or operations) of FIGS. 1-3. As another example, one or more blocks associated with FIG. 6 may be combined with one or more blocks (or operations) associated with FIGS. 1-2 and 5.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and "back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
   receiving a first user input specifying a first depth of focus;
   determining, prior to image capture by a camera, a second aperture size that corresponds to the first depth of focus;
   determining, prior to image capture by the camera, a first aperture size of a plurality of aperture sizes of the camera that is nearest the second aperture size, wherein the first aperture size is smaller than the second aperture size;
   receiving image data comprising a representation of a scene captured with the camera configured with the first aperture size; and
   determining first modified image data by applying a first blur kernel to the image data, wherein the first modified image data represents the scene at the depth of focus corresponding to the second aperture size.

2. The method of claim 1, wherein the first depth of focus is one of a plurality of depths of focus along a sliding scale.

3. The method of claim 1, wherein the camera includes a variable aperture lens configured to capture an image at each of the plurality of aperture sizes.

4. The method of claim 3, wherein the plurality of aperture sizes does not include the second aperture size.

5. The method of claim 1, wherein the first blur kernel is determined based on the second aperture size.

6. The method of claim 1, wherein the first blur kernel decreases a blurriness of at least a segment of the representation of the scene.

7. The method of claim 1, wherein the blur kernel increases a blurriness of at least a segment of the representation of the scene.

8. The method of claim 1, further comprising:
   receiving, subsequent to determining the first modified image data, a second user input specifying a second depth of focus different than the first depth of focus, wherein the second depth of focus corresponds to a third aperture size that is different than the first aperture size and the second aperture size; and
   determining second modified image data by applying a second blur kernel to at least one of the image data or the first modified image data, wherein the second modified image data represents the scene at the second depth of focus.

9. An apparatus, comprising:
   a memory storing processor-readable code; and
   at least one processor coupled to the memory, the at least one processor configured to execute the processor-readable code to cause the at least one processor to perform operations including:
   determining, prior to image capture by a camera, a second aperture size that corresponds to the first depth of focus;
   determining, prior to image capture by the camera, a first aperture size of a plurality of aperture sizes of the camera that is nearest the second aperture size, wherein the first aperture size is smaller than the second aperture size;

receiving image data comprising a representation of a scene captured with the camera configured with the first aperture size; and determining first modified image data by applying a first blur kernel to the image data, wherein the first modified image data represents the scene at the depth of focus corresponding to the second aperture size.

10. The apparatus of claim 9, wherein the first depth of focus is one of a plurality of depths of focus along a sliding scale.

11. The apparatus of claim 9, wherein the camera includes a variable aperture lens configured to capture an image at each of the plurality of aperture sizes.

12. The apparatus of claim 11, wherein the plurality of aperture sizes does not include the second aperture size.

13. The apparatus of claim 9, wherein the first blur kernel is determined based on the second aperture size.

14. The apparatus of claim 9, wherein the first blur kernel decreases a blurriness of at least a segment of the representation of the scene.

15. The apparatus of claim 9, wherein the first blur kernel increases a blurriness of at least a segment of the representation of the scene.

16. The apparatus of claim 9, wherein the operations further include:

receiving, subsequent to determining the first modified image data, a second user input specifying a second depth of focus different than the first depth of focus, wherein the second depth of focus corresponds to a third aperture size that is different than the first aperture size and the second aperture size; and determining second modified image data by applying a second blur kernel to at least one of the image data or the first modified image data, wherein the second modified image data represents the image data at the second depth of focus.

* * * * *